July 2, 1935.  G. A. ROLLAND  2,007,063

BLOCK MOLDING APPARATUS

Filed Dec. 13, 1933   2 Sheets-Sheet 1

G. A. Rolland INVENTOR

BY Victor J. Evans & Co. ATTORNEY

WITNESS:

July 2, 1935.  G. A. ROLLAND  2,007,063
BLOCK MOLDING APPARATUS
Filed Dec. 13, 1933  2 Sheets-Sheet 2
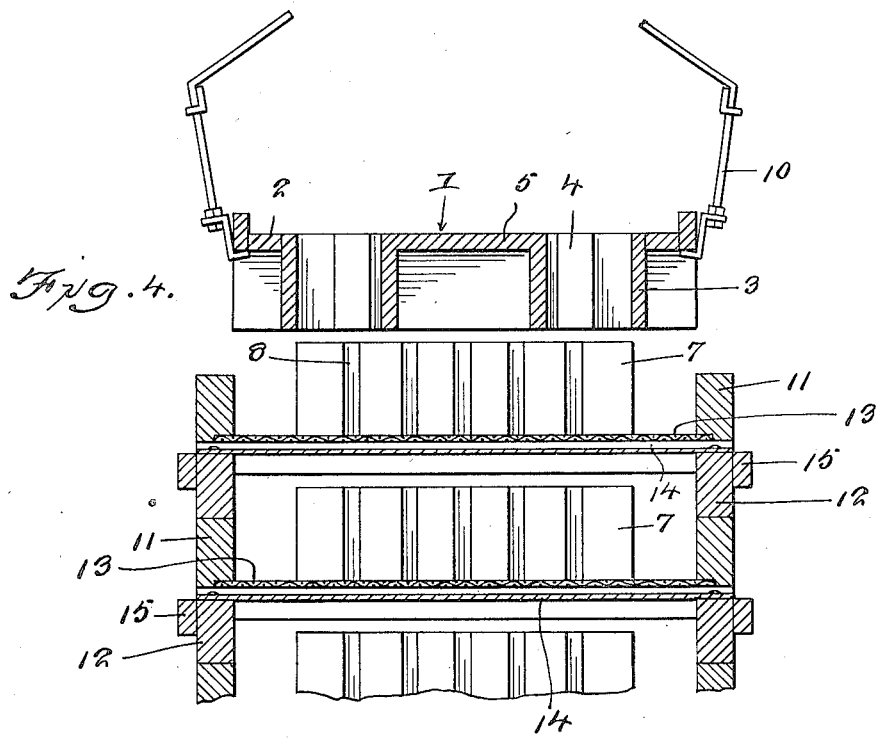
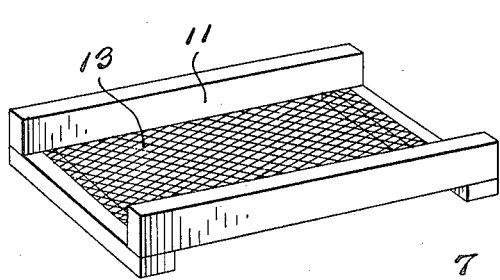
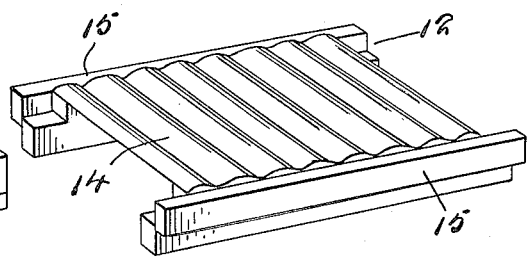
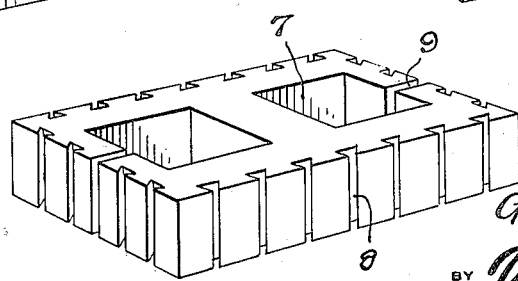

Patented July 2, 1935

2,007,063

UNITED STATES PATENT OFFICE 2,007,063

BLOCK MOLDING APPARATUS

George A. Rolland, Jamestown, N. Y.

Application December 13, 1933, Serial No. 702,244

1 Claim. (Cl. 25—1)

This invention relates to plastic building units and the mold for the making thereof and has for the primary object the provision of a mold unit capable of forming a building unit of a desired shape and size and with grooves to receive mortar or a binder so as to efficiently tie building units of this character together when assembled and also to facilitate the applying and holding thereto plaster, stucco or other finishing material.

Another object of this invention is the provision of an improved tray for the mold unit which will permit water or other fluid to readily drain from the plastic material while in the mold unit to quicken the setting of said plastic material and also to provide vent means to aid in the removal of the mold unit from the plastic material without the danger of suction injuring the molded unit.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a mold unit constructed in accordance with my invention.

Figure 4 is a fragmentary sectional view showing the stacking of several trays one upon the other and with a mold unit being lifted from the uppermost tray leaving thereon the molded unit.

Figure 5 is a perspective view illustrating one of the elements of the tray.

Figure 6 is a similar view showing the other element of the tray.

Figure 7 is a perspective view illustrating the building unit formed by the mold unit.

Figure 1:
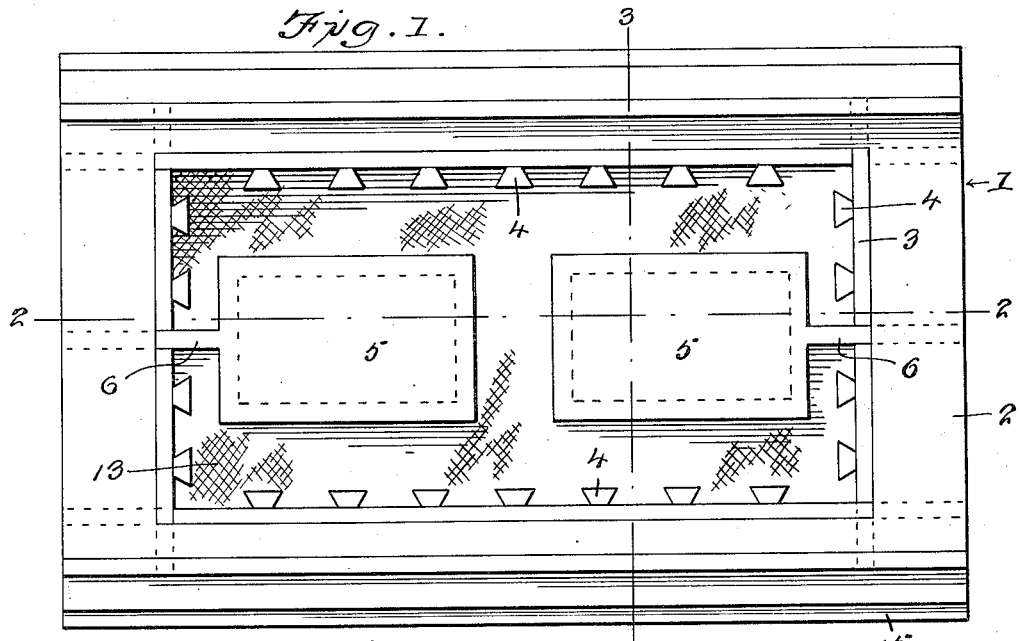
Figure 2:
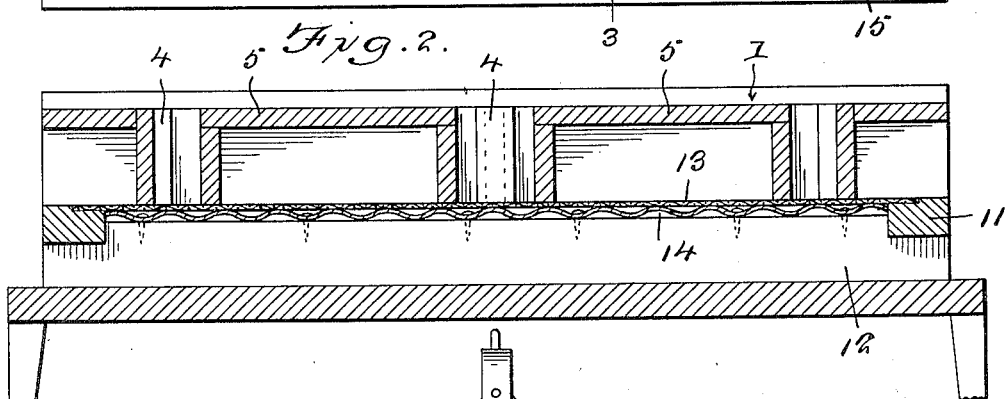
Figure 2 is a sectional view taken on the line 2—2 of Figure 1.
Figure 3:
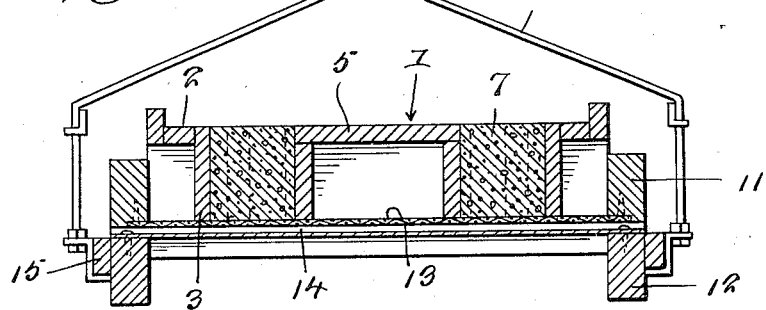
Figure 3 is a sectional view taken on the line 3—3 of Figure 1 showing a grapple applied to the mold unit.

Referring in detail to the drawings, the mold unit 1 consists of a base 2 which has formed integrally therewith mold walls 3 provided upon their inner faces with groove forming lugs 4 which extend the full height of the wall and are relatively spaced and of substantially triangular shape in cross section. Cast integral with the base 2 and within the walls 3 are opening forming blocks or elements 5, relatively spaced to each other and each connected with an end wall of the mold unit by a rib 6. The ribs 4 and 6 of the mold unit form in the finished block or building unit 7 a series of grooves 8 and 9, the grooves 8 being of substantially triangular shape in cross section for the purpose of receiving mortar or other material for effectively binding together building units when assembled and also will receive therein plaster, stucco or like finishing material when applied to the outer surface of the building unit. The building material also will be received by the grooves 9.

The base 2 of the mold projects beyond the mold walls and thereby provides flanges to be engaged by a suitable grapple 10 of a hoisting mechanism (not shown) whereby the mold unit can be carried from one place to another and be readily lifted off of a molded unit after the setting of the latter.

Used in conjunction with the mold unit 1 is a plurality of trays which may be stacked one upon the other, as shown in Figure 4, with each tray supporting a molded unit. Each tray consists of sections 11 and 12 detachable from each other, the section 11 having a foraminous bottom 13 and the section 12 having a solid corrugated bottom 14. The section 11 rests upon the section 12 with the foraminous bottom 13 in engagement with the corrugated bottom 14, the molded unit resting on the foraminous bottom so that during the setting of the molded unit surplus water may readily drain therefrom due to the corrugations in the bottom 14 of the section 12, the corrugations also providing vent means to prevent the suction from injuring the molded unit when the mold unit 1 is lifted therefrom, as shown in Figure 4. The section 12 is provided with side strips 15 which the grapple 10 may engage when lifting the tray with the mold unit thereon.

In operation, a tray with the mold unit thereon is placed on a workbench and the plastic material is poured or otherwise placed in the mold unit and the tray and the mold unit is then lifted by a hoisting mechanism from the workbench and positioned at some desired place for setting of the plastic material. The setting of the plastic material may rapidly take place due to the fact that the water of said plastic material can readily drain therefrom. After the plastic material has hardened to a desired degree, the mold unit is lifted from the tray, as shown in Figure 4, leaving the molded unit on the tray for further setting. Any number of trays with the molded units thereon can be stacked one upon the other and thereby conserve space.

Having described the invention, I claim:

A device of the character set forth comprising pairs of superimposed rectangular-shaped frames and each pair of frames defining a space for the reception of a molded article with the latter spaced from the frames, foraminous bottoms closing the lower frames of each pair and supporting the molded articles, and corrugated sheet members engaging the frame bottoms and carried by the upper frame of each pair and spaced from the molded articles adjacent thereto.

GEORGE A. ROLLAND.